(12) United States Patent
Zhang et al.

(10) Patent No.: US 9,410,095 B2
(45) Date of Patent: Aug. 9, 2016

(54) METHOD OF GASIFICATION OF BIOMASS USING GASIFICATION ISLAND

(71) Applicant: WUHAN KAIDI GENERAL RESEARCH INSTITUTE OF ENGINEERING & TECHNOLOGY CO., LTD., Wuhan (CN)

(72) Inventors: Yanfeng Zhang, Wuhan (CN); Minggui Xia, Wuhan (CN); Hongtao Nie, Wuhan (CN); Wenyan Liu, Wuhan (CN); Liang Zhang, Wuhan (CN)

(73) Assignee: WUHAN KAIDI ENGINEERING TECHNOLOGY RESEARCH INSTITUTE CO., LTD., Wuhan (CN)

( * ) Notice: Subject to any disclaimer, the term of this patent is extended or adjusted under 35 U.S.C. 154(b) by 230 days.

(21) Appl. No.: 14/316,727

(22) Filed: Jun. 26, 2014

(65) Prior Publication Data
US 2014/0305043 A1    Oct. 16, 2014

Related U.S. Application Data

(63) Continuation-in-part of application No. PCT/CN2012/083589, filed on Oct. 26, 2012.

(30) Foreign Application Priority Data

Dec. 29, 2011 (CN) .......................... 2011 1 0449566

(51) Int. Cl.
| | |
|---|---|
| *C01B 3/36* | (2006.01) |
| *C10J 3/84* | (2006.01) |
| *C10J 3/18* | (2006.01) |
| *C10K 1/02* | (2006.01) |
| *C10K 1/06* | (2006.01) |
| *C10J 3/86* | (2006.01) |

(52) U.S. Cl.
CPC .... *C10J 3/84* (2013.01); *C10J 3/18* (2013.01); *C10K 1/028* (2013.01); *C10K 1/06* (2013.01); *C10J 3/86* (2013.01); *C10J 2200/158* (2013.01); *C10J 2300/0906* (2013.01); *C10J 2300/0916* (2013.01); *C10J 2300/0956* (2013.01); *C10J 2300/0976* (2013.01); *C10J 2300/1238* (2013.01); *C10J 2300/1693* (2013.01); *Y02E 20/18* (2013.01); *Y02P 20/129* (2015.11); *Y02P 20/145* (2015.11)

(58) Field of Classification Search
CPC ................ C10J 2300/0916; C10G 2300/1011; C10B 53/02
See application file for complete search history.

(56) References Cited

U.S. PATENT DOCUMENTS

| | | | | |
|---|---|---|---|---|
| 6,032,467 | A * | 3/2000 | Oshita ................ | C10J 3/66 60/39.12 |
| 2003/0005634 | A1* | 1/2003 | Calderon ............ | C10J 3/08 48/210 |
| 2007/0079554 | A1* | 4/2007 | Schingnitz .......... | C10J 3/466 48/210 |
| 2007/0256361 | A1* | 11/2007 | Kindig ................ | C01B 3/105 48/197 R |

(Continued)

*Primary Examiner* — Imran Akram
(74) *Attorney, Agent, or Firm* — Matthias Scholl P.C.; Matthias Scholl

(57) ABSTRACT

A method of gasification of biomass using a gasification island. The gasification island includes: a biomass pre-treatment and storage unit, a biomass feeder, an external heat source, a gasifier, a crude syngas cooling unit, a crude syngas washing unit, a fresh syngas storage unit, and an ash and wastewater treatment unit. The method includes: pre-treating and storing biomass, gasifying the biomass in the gasifier, cooling a crude syngas, washing and removing dust from the crude syngas, and storing fresh syngas.

8 Claims, 3 Drawing Sheets

(56) References Cited

U.S. PATENT DOCUMENTS

| | | | |
|---|---|---|---|
| 2008/0147241 A1* | 6/2008 | Tsangaris | C10J 3/00 700/273 |
| 2008/0236043 A1* | 10/2008 | Dinjus | C10B 53/02 48/197 R |
| 2009/0064578 A1* | 3/2009 | Theegala | C10J 3/26 48/76 |
| 2009/0094893 A1* | 4/2009 | Neumann | C10J 3/463 48/62 R |
| 2010/0088959 A1* | 4/2010 | Meyer | C10J 3/42 48/62 R |
| 2010/0216898 A1* | 8/2010 | Tonseth | C10B 49/04 518/703 |
| 2011/0036014 A1* | 2/2011 | Tsangaris | C01B 3/22 48/62 R |
| 2011/0146155 A1* | 6/2011 | Bentzen | C10J 3/34 48/89 |
| 2014/0004471 A1* | 1/2014 | Vandergriendt | F23K 5/007 431/12 |

* cited by examiner

METHOD OF GASIFICATION OF BIOMASS USING GASIFICATION ISLAND

CROSS-REFERENCE TO RELATED APPLICATIONS

This application is a continuation-in-part of International Patent Application No. PCT/CN2012/083589 with an international filing date of Oct. 26, 2012, designating the United States, and further claims priority benefits to Chinese Patent Application No. 201110449566.9 filed Dec. 29, 2011. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18$^{th}$ Floor, Cambridge, Mass. 02142.

BACKGROUND OF THE INVENTION

1. Field of the Invention

The invention relates to a method for biomass gasification at a high temperature and an atmospheric pressure by using an integrated gasification island.

2. Description of the Related Art

Existing gasification technologies include fixed bed gasification, fluidized bed gasification, and spouted-fluidized bed gasification. The fixed bed imposes high requirements on the thermal stability, the mechanical strength, and the adhesion of the raw material. It has been proved that by using the normal fixed bed for biomass gasification, the crude gas has a relatively high content of tar, and the normal fixed bed cannot operate stably for a long-term in engineering application and is uneconomic. Although the fluidized bed gasification process has broad fuel adaptability, the crude gas has high content of $CH_4$, tar, and fly ash, the conversion efficiency of the effective gas ($CO+H_2$) is low, and the process for washing and purifying the crude gas is relatively complicate. The spouted-fluidized bed gasification has high efficiency and is currently the most advanced gasification technology, however, it has narrow fuel adaptability, and the crushing of the biomass fuel costs too much, thereby being difficult to realize.

SUMMARY OF THE INVENTION

In view of the above-described problems, it is one objective of the invention to provide a method for biomass gasification at a high temperature and an atmospheric pressure by using a gasification island. The method for biomass gasification has high carbon conversion efficiency from the raw material, broad fuel adaptability, very low tar content in the crude syngas, high availability of the apparatus, compact structure, simple system, small investment, stable operation, low operation cost, and is suitable for large-scale commercial application.

To achieve the above objective, in accordance with one embodiment of the invention, there is provided a method for biomass gasification at a high temperature and an atmospheric pressure by using a gasification island. The method comprises: pre-treating and storing biomass, gasifying the biomass in a gasifier, cooling a crude syngas, washing and removing dust from the crude syngas, and storing fresh syngas. Heat energy for gasifying the biomass in the gasifier is supplied by an external heat source, and a reaction temperature in the gasifier is controlled between 1300 and 1750° C. The biomass in the gasifier is transformed into the crude syngas, and a slag is removed from the gasifier in a liquid state. The crude syngas is cooled by a quench tower and a two-stage waste heat boiler, where sensible heat is recovered. The crude syngas after cooling is washed and treated by an electric dust precipitator, and the obtained clean and fresh syngas is stored by a gas storage tank. The whole gasification island is operated at a negative pressure or at a positive pressure of between 0 and 50 kPa.

Specifically, the method for biomass gasification comprises the following steps:

1) crushing the collected biomass, feeding the biomass to the gasifier while providing the external heat source and an oxidant to the gasifier, controlling an operating temperature of the gasifier at between 1300 and 1750° C., and allowing the biomass to fully contact with the oxidant so that desiccation, volatile matter precipitation, pyrolysis, and gasification reaction occur, respectively, whereby yielding the crude syngas and an ash;
2) introducing the crude syngas to the quench tower and the two-stage waste heat boiler to decrease the temperature of the crude syngas to between 85 and 200° C. and to recover the sensible heat; and
3) washing the crude syngas after sensible heat recovery and removing the dust therefrom to obtain the clean and fresh syngas having both a dust content and a tar content of <10 mg/Nm$^3$ and a temperature of <45° C.; and transporting the clean and fresh syngas to the gas storage tank for storage or directly to a downstream process for use.

In a class of this embodiment, the external heat source is supplied by a plasma torch generator, a microwave plasma generator, or a laser thermal generator.

In a class of this embodiment, in the whole process from the gasification of the biomass fuel into the fresh syngas to the forming of the fresh syngas, the whole apparatus is operated at the negative pressure or the micro positive pressure of between 0 and 50 kPa.

Specifically, the gasification island comprises: a biomass pre-treatment and storage unit, a biomass feeder, an external heat source, a gasifier, a crude syngas cooling unit, a crude syngas washing unit, a fresh syngas storage unit, and an ash and wastewater treatment unit.

1. Biomass Pre-Treatment and Storage Unit

Raw materials (like the biomass and municipal solid waste) are simply pre-treated in the fuel acquisition position or the plant, where the raw materials are broken into particles having a diameter of between 50 and 300 mm. The fuel after the crushing treatment is stored in a fuel storage room in the plant. Small particles like rice hulls can be directly used as the fuel of the gasifier without any treatment and stored in the fuel.

For the municipal solid waste and industrial waste, separation is firstly carried out, in which, metal and paper products therein are recovered and construction waste like large bricks are separated. The waste after the separation is broken into particles having the diameter of between 50 and 300 mm and is used as the fuel of the gasifier and is stored in the biomass fuel storage room.

A main device in this method is a crusher.

2. Biomass Feeder

The biomass feeder is formed by a biomass transporting system and a gasifier feeding system.

The biomass is transported from the fuel storage room to a front hopper of the gasifier via a belt conveyor or a scraper conveyor provided with a measuring device, for decreasing the fugitive dust and the spilled fuel. A glass steel cover of the transporter is sealed. If the belt conveyor is employed, a mounting angle of the transporter is preferably controlled at between 15° and 18°, and a maximum is no larger than 20°.

The fuel is continuously fed into the gasifier reactor by two routes arranged on two sides of the gasifier for avoiding explosion and intoxication of the crude syngas escaped from the gasifier reactor. The feeding of the gasifier adopts a screw feeding device comprising a sealing plug, and preferably a two-stage screw feeding device comprising a sealing plug disclosed in CN202040828U. Besides, nitrogen sealing protection device and a water spray protection device are added for ensuring the security.

The nitrogen gas has a purity of higher than 99.9% and a pressure of between 0.3 and 0.7 megapascal.

The spray water employs fire water which is accessed from a fire pipeline.

3. External Heat Source

The external heat source is supplied by a plasma torch generator, a microwave plasma generator, or a laser thermal generator. Such external heat source provides highly qualified heat source for gasification. Inert materials are placed in a bottom of the reactor to form a bed layer. Characteristics of high temperature and high activity of the plasma are utilized to strengthen the gasification method. A high temperature reaction zone at the temperature of between 1300 and 1750° C. is constructed, thereby largely improving and facilitating the gasification method.

The external heat source employs the plasma torch technology and specifically comprises: a plasma torch body, an arc igniter, a torch medium supply system, a torch power supply system, and a torch cooling protector system. A flame outlet of the plasma torch is connected to the gasifier for supplying heat energy to the gasifier. The torch power supply system is connected to a positive electrode and a negative electrode of the torch for supplying energy to the plasma torch. A circulating water cooling pipe is connected to cooling pipes of electrodes of the plasma torch for cooling the electrodes and improving the service life of the electrodes to be longer than 2000 hr. A torch medium supply pipe is connected to a medium inlet pipe of the plasma torch, and fourth state plasma is activated between electrodes of the torch and enters the gasifier as an activated energy. The arc igniter is used to start the plasma torch.

4. Gasification Unit

The gasifier is an atmospheric fixed bed gasifier, an operating pressure thereof is between 0 and 50 kPa, and a temperature of a gasification zone is between 1300 and 1750° C. A gasification medium is selected from the group consisting of air, oxygen-enriched air, pure oxygen, water vapor, or a mixture thereof. Because of the heat energy supplied by external heat source and the existence of a large amount of plasma having high activity, the gasification reaction undergoes at a high reaction velocity and results in a high carbon conversion, approximately 99.8% above. A temperature of the bottom of the gasifier is controlled between 1450 and 1750° C. whereby realizing the slag removal in the liquid state. Slag removal from the gasifier adopts continuous slag removal or intermittent slag removal according to the ash content. The continuous slag removal is adopted when the raw material has a high ash content, and the intermittent slag removal is adopted when the raw material has a low ash content. A temperature of an upper part of the gasifier is controlled between 800 and 1450° C., a flow velocity of the crude syngas therein is controlled between 0.5 and 2.0 m/s, so that the retention time of the crude syngas in the gasifier is prolonged and complete decomposition of hydrocarbons of large molecule in the crude syngas is ensured. The crude syngas is eventually introduced out of the gasifier via the upper part thereof, the flow velocity of the crude syngas at an outlet of the gasifier is controlled between 8 and 20 m/s, and the dust content in the crude syngas is <20 g/Nm$^3$.

The gasification unit is mainly composed of a gasifier body and accessories thereof.

5. Crude Syngas Cooling Unit

The crude syngas is introduced out of the gasifier to the crude syngas cooling unit for recovering the waste heat.

The crude syngas cooling unit comprises a water cooling or gas cooling or adiabatic pipe, the quench tower, and the two-stage waste heat boiler.

The crude syngas is introduced from the gasifier through the water-cooling pipe to the quench tower, where the crude syngas is cooled to a temperature of below 850° C. by the spray water, a water-cooling bundle, or a vapor-cooling bundle, and a molten slag carried by the crude syngas is cured and separated. The crude syngas having the temperature of below 850° C. after treated by the quench tower is transported to a first-stage waste heat boiler for recovering the waste heat, the temperature of the crude syngas is decreased to above a condensation point of a heavy tar so that the heavy tar therein is prevented from condensation, and the temperature of the crude syngas is decreased to between 350 and 450° C. A flow velocity of the crude syngas in the first-stage waste heat boiler is controlled between 7 and 20 m/s. An ash hopper is provided to remove fly ash. The crude syngas from the first-stage waste heat boiler is transported to the second-stage waste heat boiler for recovering the waste heat. The crude syngas is continued being cooled and the temperature of the crude syngas is decreased to between 85 and 200° C., so that the heavy tar is condensed in the second-stage waste heat boiler and is collected by a chute. The flow velocity of the crude syngas in the second-stage waste heat boiler is controlled between 7 and 20 m/s. The fly ash is discharge by the ash hopper.

The crude syngas cooling unit mainly comprises: the two-stage waste heat boiler, the quench tower, the water-cooling bundle, and a circulating water pump. The first-stage waste heat boiler is the waste heat boiler of a water-tube type, and the second-stage waste heat boiler is the waste heat boiler of a heat-tube type.

6. Crude Syngas Washing Unit

The crude syngas after the heat recovery has the temperature decreased to between 85 and 200° C. and the dust content of ≤20 g/Nm$^3$. The crude syngas is transported a pipe to a scrubbing-cooling tower or a Venturi scrubber for further decreasing the temperature of the crude syngas and removing the dust therefrom. The temperature of the crude syngas after washing is decreased to between 15 and 55° C. and the wash water is circulated for use. A filter is disposed on a water circulating pipe to remove pollutants carried by the circulating wash water. Thus, water quality of the circulating water is prevented from deterioration, and times for pollutant discharge are decreased. The pollutants are discharged in time according to the water quality of the circulating wash water, and fresh circulating water is supplemented. The circulating water is cooled by a mechanical draft hollow cooling tower. A filter residue after curing is returned to the gasifier as the bed layer or is transported to an ash library along with the molten slag, thereby realizing a comprehensive utilization.

The crude syngas from the scrubbing-cooling tower or the Venturi scrubber is introduced to a wet electric dust collector, where the dust and other impurities in the crude syngas is removed under the action of a high voltage electric field produced therein. The fresh syngas from the wet electric dust collector is transported by a coal gas booster fan to the gas storage tank or directly supplied to devices of the subsequent process as a feed gas.

The crude syngas washing unit mainly comprises: the scrubbing tower, the electric dust collector, the cooling tower, the filter, the booster fan, and the circulating water pump.

7. Fresh Gas Storage Unit

The fresh gas after cooling and washing is transported by the coal gas booster fan and the pipe to the gas storage tank of a wet type or a dry type for supplying to subsequent processes.

The fresh gas storage unit is mainly the gas storage tank.

8. Ash and Wastewater Treatment Unit

The ash and slag produced in the biomass gasification island: the molten slag produced in the gasifier and the ash produced in the cooling and the washing units. The high temperature molten slag produced in the gasifier is granulated and used as a building material for comprehensive utilization. The ash from the cooling and washing units are cured and used as the bed layer of the gasifier for recycling.

A slag removing system of the gasifier is composed of a slag removing chute, a slag tank, and an exhaust system.

The ash in the washing unit is filtered from the circulating wash water by the filter and collected.

The wastewater produced in the method includes the wastewater from syngas washing and a condensate of the syngas produced in the gas storage tank. The water in the wastewater from the syngas washing is primarily brought in by the fuel, enters the washing unit along with the crude syngas, and is then precipitated in the washing process.

The wastewater is transported by the wastewater pipe to the wastewater treatment device for recycling.

Compared with the prior art, the method for biomass gasification of the invention has the following advantages:

1) The plasma torch is utilized to provide the external heat source for gasification. The slag is discharged in the liquid state. The gasification reaction has a high temperature, high gasification velocity, and high carbon conversion. The quality of the crude gas is high.

2) The gasification is conducted in the atmospheric fixed bed. The gasifier body has simple structure, small investment, and easy operation. Besides, the feed system, the slag collecting system and the purification system are simple.

3) The raw material adaptability is broad, and biomass of different kinds, MSW, coal, and slug are available. Thus, mixed gasification of multi-kind of raw materials can be realized.

4) Air, oxygen-enriched air, pure oxygen, water vapor, or a mixture thereof is used as the oxidant.

5) The two-stage waste heat boiler is employed to recover the sensible heat, so that the overall thermal efficiency of the coal gas is improved.

6) The gasification island has short flow and small investment on the devices.

7) The gasification island has short start time and good regulating property.

8) The gasification island has a mature system, high localization degree, low system failure rate, and high availability.

Figure 1:
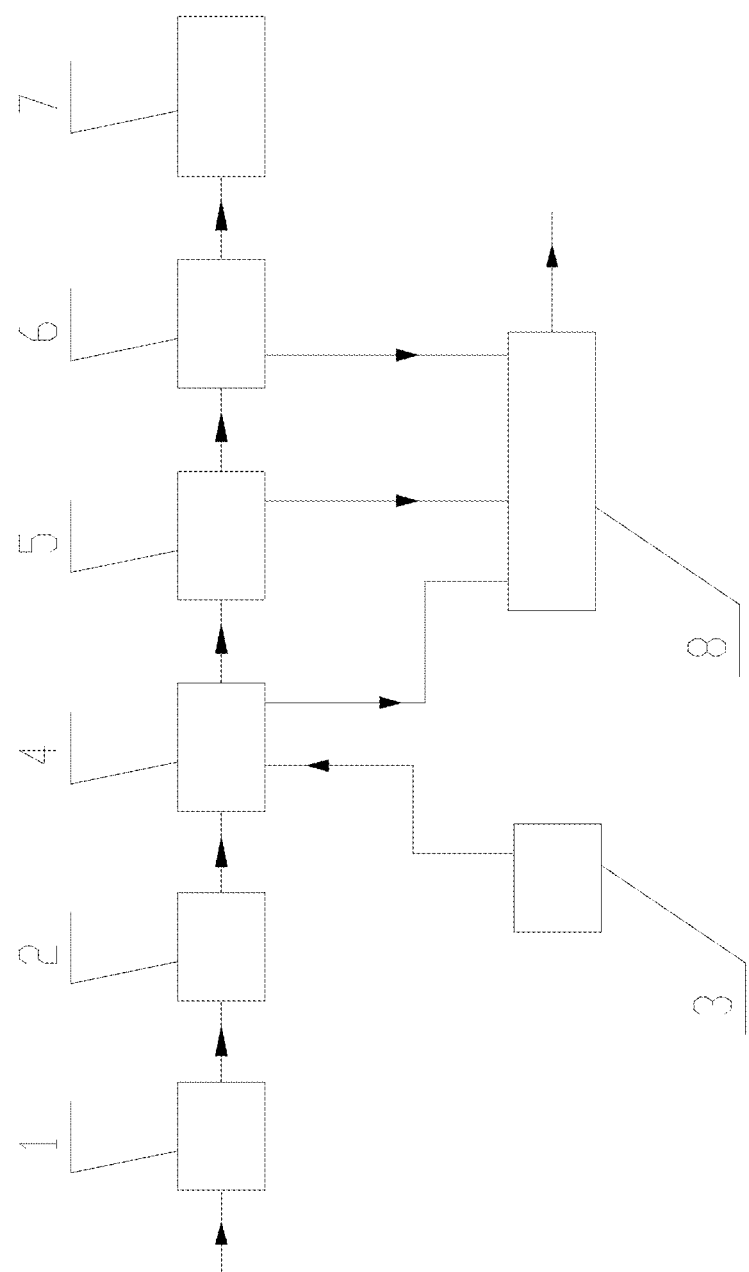
FIG. 1 is a structure diagram of a gasification island according to one embodiment of the invention.

In the drawing, the following reference numbers are used: 17. Water-cooling flue; 18. Water-cooling quench tower; 19. Waste heat boiler of water-tube pipe; 20. Waste heat boiler of heat-tube pipe; 21. Scrubbing-cooling tower; 22. Wet electric dust collector; 23. Coal gas booster fan; 24. Wet gas tank; and 25. Flare.

DETAILED DESCRIPTION OF THE EMBODIMENTS

A method for biomass gasification at a high temperature and an atmospheric pressure by using a gasification island is further illustrated combined with specific embodiments and the drawings.

As shown in FIG. 1, a method for biomass gasification at a high temperature and an atmospheric pressure is conducted on a gasification island comprising a pre-treatment and storage unit 1 for treating raw materials, a biomass feeder 2, an external heat source 3, a gasifier 4, a cooling unit 5 for cooling crude syngas, a washing unit 6 for washing the crude syngas, a storage unit 7 for storing fresh syngas, and a treating unit 8 for treating ash and wastewater. These devices together form an efficient gasification island and supply the fresh syngas to subsequent process of synthesizing biodiesel or integrated gasification combined cycle (IGCC).

The biomass feeding process utilizes a two-stage screw feeding technology for feeding the biomass according to Chinese Patent Application No. 201120140199.x.

Example: the gasification island employs an atmospheric fixed bed gasifier provided with an external heat source and a two-stage waste heat boiler. Specifically, the gasification island comprises: the pre-treatment and storage unit for treating the raw materials, the biomass feeder, the external heat source, the gasifier, the cooling unit for cooling the crude syngas, the washing unit for washing the crude syngas, the storage unit for storing the fresh syngas, and the treating unit for treating the ash and the wastewater.

The method for the biomass gasification is specifically performed as follows:

1) biomass fuel is collected and simply broken until a diameter thereof is decreased to below 300 mm, the broken biomass is then transported by a belt conveyor to the biomass feeder.

2) Inert materials (such as filter residue after curing) are added to a bottom of the gasifier by a feeding device to form a bed layer having a certain thickness. The gasifier employs an adiabatic insulation or cooling mode.

3) The external heat source 3 is started, a temperature of the gasifier is controlled at between 1300 and 1750° C., and a pressure at an outlet of the gasifier is controlled at between 0 and 50 kPa. Meanwhile, an oxidant is sprayed into the gasifier. Melted matters form in regions of the inert bed layer and a fuel layer. The high temperature flue gas gasifies the biomass fuel, so that organics in the fuel is pyrolyzed into CO and $H_2$, and inorganic ash is melted to form a molten slag which is then discharged from the inert bed and out of the gasifier via the bottom thereof.

4) The crude syngas flows upwardly, passes through an outlet pipe arranged on an upper part of the gasifier, and enters the two-stage waste heat boiler, so that the temperature of the crude syngas is decreased to between 85 and 200° C., and sensible heat is recovered.

5) The crude syngas enters the washing unit to further decrease the temperature thereof to between 15 and 55° C., hazardous substances like the dust are removed therefrom to obtain the fresh syngas which is transported by a coal gas booster fan to a gas storage tank for storage or to the downstream process for use.

6) The ash and the wastewater produced in the gasification method are treated for recycling or for comprehensive utilization.

The external heat source is a device that employs an external heat source generating device to provide heat energy for gasification of combustibles. The external heat source generating device is a device that produces the heat source by electric energy, like a plasma torch generator and a microwave plasma generator, or by light source, like a laser thermal generator.

The oxidant is a mixed gas comprising air, oxygen, water vapor, or a mixed gas comprising air and the water vapor, or a mixed gas comprising oxygen and the water vapor.

Figure 2:
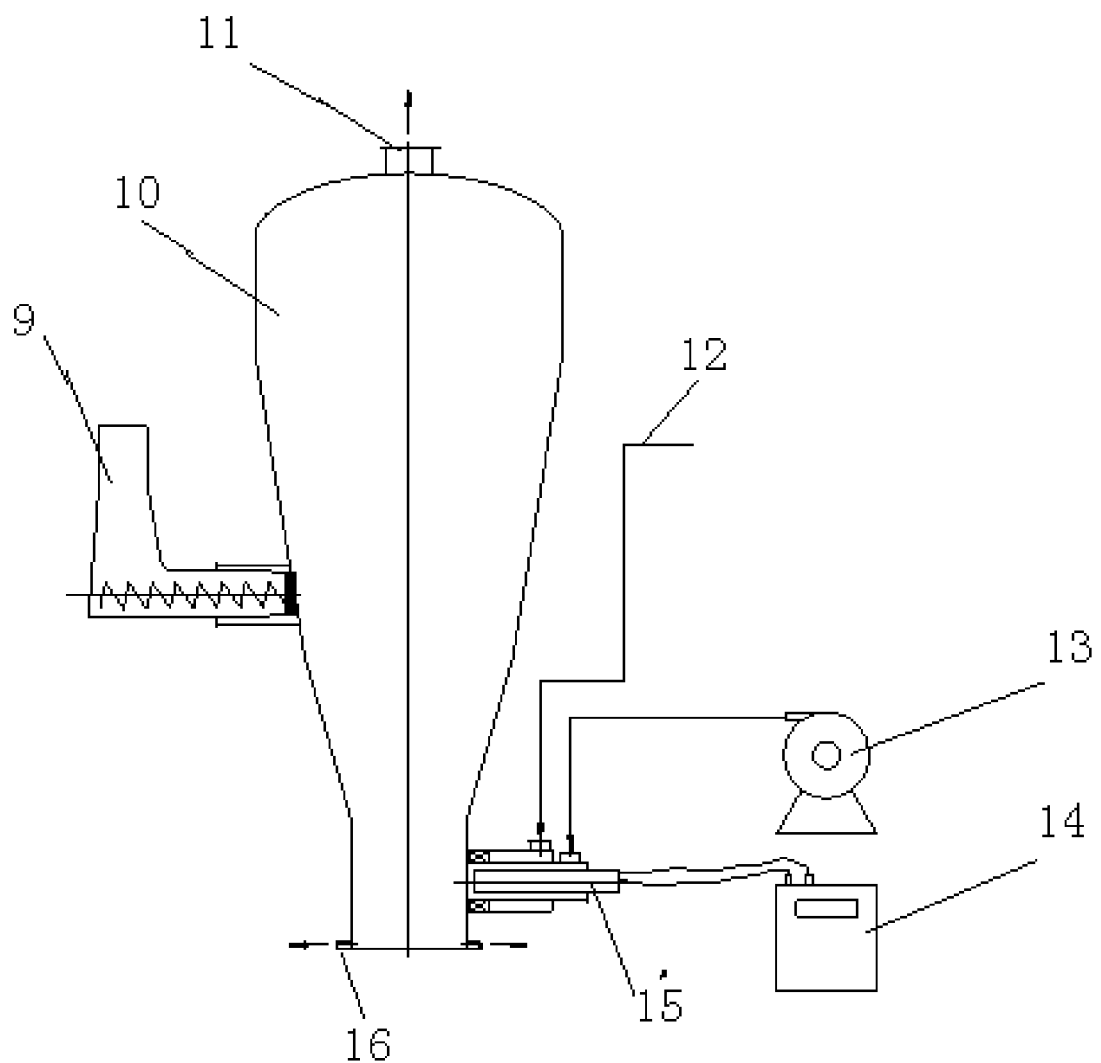
FIG. 2 is a structure diagram of a gasifier in a gasification island according to one embodiment of the invention.

As shown in FIG. 2, the gasifier in the gasification island comprises: a screw feeding device 9 comprising a sealing plug, the gasifier 10, superheated steam 12, an air compressor 13, a torch power supply 14, and the plasma torch 15. An outlet of the screw feeding device 9 is connected to a feed inlet of the gasifier 10. Both a gas outlet of the air compressor 13 and a superheated steam pipe are connected to a gasification medium inlet arranged on a side of a lower part of the gasifier 10. The broken biomass fuel is continuously fed to the gasifier 10 via the screw feeding device 9. The sealing plug of the screw feeding device 9 prevents the high temperature syngas from back flowing and bears certain pressure fluctuation in the gasifier. The amount of the fuel is regulated by regulating a rotational speed of the screw feeding device 9.

The gasifier 10 is an upper-draft fixed bed gasifier comprising a crude syngas outlet 11 disposed at a top thereof, a slag outlet 16 disposed at the bottom thereof, and the gasification medium inlet disposed at the side of the lower part thereof beneath the fixed bed. The gasifier is in an adiabatic form, an outer part thereof is a steel housing, a liner thereof is made of an adiabatic insulating material, and a surface facing the fire is made of high chrome bricks, so that the gasifier is capable of bearing the high temperature as well as bearing corrosion of the gasification environment. The gasifier 10 is provided with a molten slag zone, an oxidation zone, a reduction zone, a pyrolysis zone, and a desiccation zone from bottom to top. Temperature ranges are correspondingly controlled according to thermo-chemical characteristics of different zones, thereby reaching a best reaction effect. For example, the temperature ranges are as follows: the molten slag zone of between 1400 and 1750° C., the oxidation and reduction zone of between 1000 and 1300° C., and a clearance zone of the upper part of the gasifier of between 900 and 1200° C. The crude syngas outlet 11 is an exit by which the crude syngas is introduced out of the gasifier. The crude syngas from the gasifier is then cooled by the waste heat boiler and treated by a scrubbing-cooling tower for dust removal to form a qualified biomass syngas. The biomass syngas after the above treatments has a caloric value of approximately between 12 and 15 $MJ/Nm^3$, belonging to a medium caloric value, and can be used as a fuel supplied to a gas turbine for power generation.

The air compressor 13 supplies air to the gasifier and air is used as a carrier of the heat energy output by the plasma torch 15. Air entering the gasifier together with the water vapor from the steam pipe 12 is used as the gasification medium for the biomass gasification, participate in the oxidation-reduction reaction, and regulate the temperature of the gasifier 2 to a certain degree.

The torch power supply 14 supplies electric power to the plasma torch 15 so that the current and the output power of the plasma torch is controlled and regulated.

As the external heat source for the reactions in the gasifier, the plasma torch 15 also maintains the high temperature in the gasifier, thereby ensuring an environment for discharge the slag in the liquid state. An outlet of the plasma torch 15, a gas outlet of the air compressor 13, and the superheated steam pipe are all connected to the gasification medium inlet. An outlet pipe of the air compressor 13 surrounds the outlet of the plasma torch 15, and the steam pipe surrounds the outlet pipe of the air compressor 13. Air is introduced from a position between two electrodes and from an outer ring of the plasma torch in a linear flow. The water vapor enters the gasifier in a rotational flow in an outermost jacket. The rotational flow enters the gasifier and increases the disturbance, thereby enhancing the gasification method. The amount of air introduced into the gasifier is determined by the quantity of the heat energy from the plasma torch to be carried. During work, combining with the loading situation of the gasifier 10, the content and the caloric value of the syngas can be regulated to a certain degree by regulating the power of the torch and the flow rate of air and the steam, thereby optimizing the gasification method.

Figure 3:
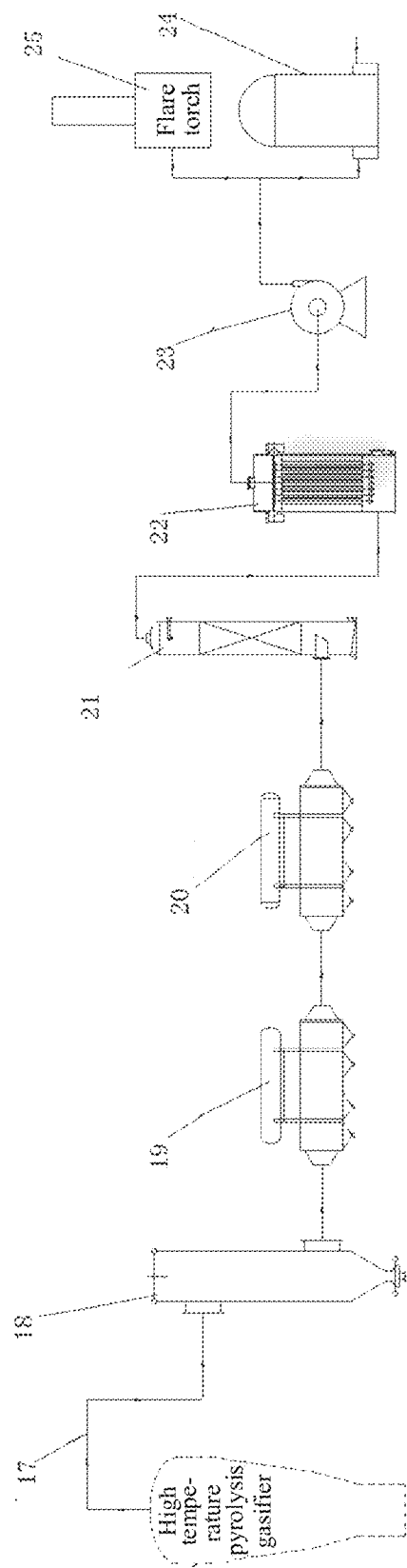
FIG. 3 is a structure diagram of a cooling unit and a washing unit for cooing and purifying crude syngas according to one embodiment of the invention.

The cooling and washing process are shown in FIG. 3. The crude syngas produced in the high temperature biomass fixed bed has the temperature of between 1000 and 1200° C., a dust content of below 20 $g/Nm^3$, and a tar content of below 3 $g/Nm^3$. In reference to the cooling and purification process of coal gas and coke oven gas. A purification process for the crude syngas is as follows: connecting the crude syngas via a high-temperature water-cooling flue, spraying water into a water-cooling quench tower to partially condensate the slag, recovering waste heat in a waste heat boiler of a water-tube type and a heat-tube pipe at two different pressures, condensing the heavy tar at the waste heat boiler of the heat-tube pipe, washing the syngas in a packed column for decreasing for decreasing the temperature and removing dust, further removing the dust and tar mist in a wet electric dust collector, and extracting the syngas by a coal gas booster fan, and transporting the syngas to a wet gas tank for storage. Process parameters are set and controlled. Thus, the syngas is cooled in two stages, the waste heat is gradually recovered, and dust removal and tar removal are gradually realized. The syngas after the cooling and the purification has both the dust content and the tar content of <10 $mg/Nm^3$, a temperature of <45° C., and a sensible heat recovery of higher than 80%.

Both the high-temperature water-cooling flue and the water-cooling quench tower adopt membrane water-cooling pipe structures, thereby decreasing the weight thereof, avoiding a problem of abscission of fire-proof materials, and improving the operation reliability. The high-temperature water-cooling flue, the water-cooling quench tower, and the waste heat boiler are in series connection to form a water circulating system, so that the water cooling problem of the circulating water is solved, and a full recovery of the heat energy is realized.

Water is sprayed into the high-temperature syngas in the water-cooling quench tower for decreasing the temperature of the syngas to 800° C. and condensing the slag in the syngas; and the slag is discharged from a tower bottom. Thus, heating surfaces of the waste heat boilers are prevented from slag pollution, and stability of heat exchange performance of the waste heat boilers is ensured.

The waste heat boiler includes a high temperature section and a lower temperature section. The temperature of the syngas at the outlet of the high temperature section of the waste heat boiler is between 350 and 450° C., which is higher than a condensation point of the heavy tar, thereby avoiding the condensation of the tar. The high temperature section employs the waste heat boiler of the water-tube type. A design pressure in the waste heat boiler of the water-tube type is equal to or larger than 1.6 megapascal, thereby improving the temperature quality of the vapor and satisfying requirements of corresponding chemical vapor. A temperature of the syngas at the outlet of low temperature section of the waste heat boiler is controlled at less than 200° C. to condense the heavy tar in this section and to collect the heavy tar by the chute. The low temperature section employs the waste heat boiler of the heat-tube type for improving the heat exchange effect. A design pressure in the waste heat boiler of the heat-tube type is 0.5 megapascal, and the low pressure vapor produced therein is supplied to the wet electric dust collector for sweeping.

The biomass syngas has both relatively low dust content and tar content. The preliminary dust removal adopts a filler type scrubbing-cooling tower rather than a cyclone dust collector or a Venturi dust collector. Not only are purposes of dust removal and temperature decrease are realized, but also harmful gases, including $H_2S$, $NH_3$, and $HCN$, are removed by washing. Furthermore, the system resistance is decreased, and the electric consumption of the fan is saved.

The wet electric dust collector is configured in the rear part of the process flow for ensuring control targets of the dust removal and the tar removal.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method of gasification of biomass using a gasification island, the gasification island comprising: a biomass pre-treatment and storage unit, a biomass feeder, an external heat source, a gasifier, a crude syngas cooling unit, a crude syngas washing unit, a fresh syngas storage unit, and an ash and wastewater treatment unit, the method comprising:
   pre-treating and storing biomass in the biomass pre-treatment and storage unit;
   crushing the stored biomass in the biomass feeder;
   gasifying the biomass in the gasifier by feeding the biomass to the gasifier while supplying the external heat source and an oxidant to the gasifier, controlling an operating temperature of the gasifier at between 1300 and 1750° C., allowing the biomass to fully contact with the oxidant so that desiccation, volatile matter precipitation, pyrolysis, and gasification reaction occur, respectively, whereby yielding a crude syngas and an ash;
   removing a slag from the gasifier in a liquid state;
   cooling the crude syngas by introducing the crude syngas to a quench tower and a two-stage waste heat boiler of the cooling unit to decrease the temperature of the crude syngas to between 85 and 200° C. and to recover the sensible heat; and
   washing the crude syngas after sensible heat recovery in the washing unit and removing the dust therefrom in an electric dust precipitator of the ash and wastewater treatment unit to obtain the clean and fresh syngas having both a dust content and a tar content of 10 mg/Nm3 and a temperature of 45° C.;
   transporting the clean and fresh syngas to the gas storage tank for storage;
wherein
   the gasification island is operated at a negative pressure.

2. The method of claim 1, wherein the external heat source is supplied by a plasma torch generator, a microwave plasma generator, or a laser thermal generator.

3. The method of claim 1, wherein
   a gasification medium is selected from the group consisting of air, oxygen-enriched air, pure oxygen, water vapor, or a mixture thereof;
   a temperature of a bottom of the gasifier is controlled between 1450 and 1750° C. whereby realizing the slag removal in the liquid state;
   slag removal from the gasifier adopts continuous slag removal or intermittent slag removal, the continuous slag removal is adopted when the raw material has a high ash content, and the intermittent slag removal is adopted when the raw material has a low ash content;
   a temperature of an upper part of the gasifier is controlled between 800 and 1450° C., a flow velocity of the crude syngas therein is controlled between 0.5 and 2.0 m/s; and
   the crude syngas is introduced out of the gasifier via the upper part thereof, the flow velocity of the crude syngas at an outlet of the gasifier is controlled between 8 and 20 m/s, and the dust content in the crude syngas is 20 g/Nm3.

4. The method of claim 1, wherein the crude syngas is cooled as follows:
   the crude syngas is introduced from the gasifier through a water-cooling pipe to the quench tower, where the crude syngas is cooled to a temperature of below 850° C. by spray water, a water-cooling bundle, or a vapor-cooling bundle, and a molten slag carried by the crude syngas is cured and separated;
   the crude syngas having the temperature of below 850° C. after treated by the quench tower is transported to a first-stage waste heat boiler for recovering waste heat, the temperature of the crude syngas is decreased to above a condensation point of a heavy tar, and a flow velocity of the crude syngas in the first-stage waste heat boiler is controlled between 7 and 20 m/s; and
   the crude syngas from the first-stage waste heat boiler is transported to the second-stage waste heat boiler for recovering the waste heat, the crude syngas is continued being cooled and the temperature of the crude syngas is decreased to between 85 and 200° C., and the flow velocity of the crude syngas in the second-stage waste heat boiler is controlled between 7 and 20 m/s.

5. The method of claim 4, wherein the crude syngas enters the first-stage waste heat boiler for recovering the waste heat, and the temperature of the crude syngas decreases to between 350 and 450° C.

6. The method of claim 1, wherein the crude syngas is washed as follows:
   the crude syngas after the heat recovery having the dust content of ≤20 g/Nm³ is transported through a pipe to a scrubbing-cooling tower or a Venturi scrubber for further decreasing the temperature of the crude syngas and removing the dust therefrom; the temperature of the crude syngas after washing is decreased to between 15 and 55° C. and the wash water is circulated for use;
   a filter is disposed on a water circulating pipe to remove pollutants carried by the circulating wash water; pollutants are discharged in time according to water quality of the circulating wash water, and fresh circulating water is supplemented;
   the circulating water is cooled by a mechanical draft hollow cooling tower; and a filter residue after curing is returned to the gasifier as a bed layer or is transported to an ash library along with the molten slag, thereby realizing a comprehensive utilization.

7. The method of claim 6, wherein the dust removal of the crude syngas is conducted as follows:

the crude syngas from the scrubbing-cooling tower or the Venturi scrubber is introduced to a wet electric dust collector, where the dust and other impurities in the crude syngas is removed under the action of an electric field produced therein; and the fresh syngas from the wet electric dust collector is transported by a coal gas booster fan to the gas storage tank or directly supplied to devices of the subsequent process as a feed gas.

8. The method of claim 1, wherein molten slags produced in the gasifier are granulated and used as a building material for comprehensive utilization; and the ash from the cooling and washing units are cured and used as a bed layer of the gasifier for recycling.

* * * * *